Apr. 3, 1923.
R. A. CROSBY
TIRE DEFLATION SIGNAL
Filed Apr. 17, 1922
1,450,769
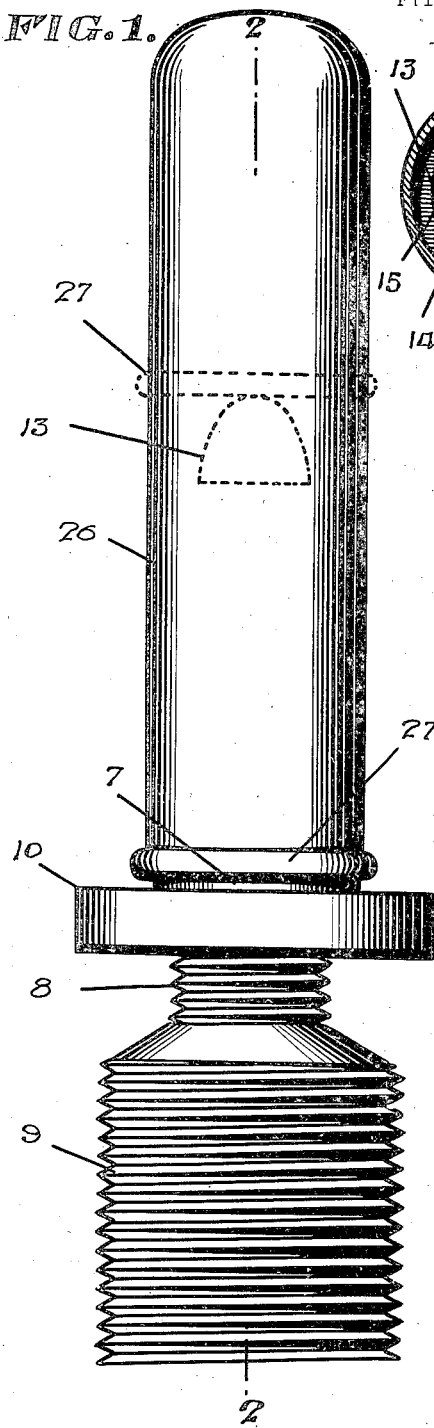
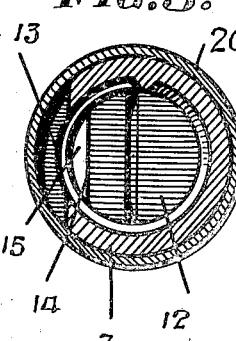
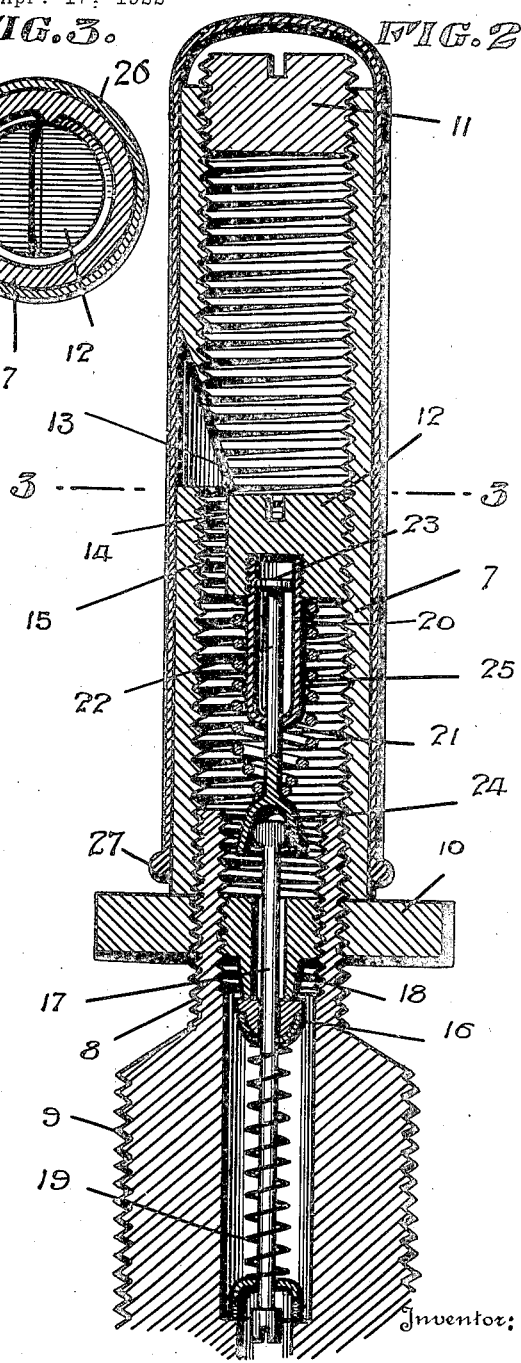
Inventor:
R. A. CROSBY,
By W. T. Fitz Gerald & Co.
Attorney.

Patented Apr. 3, 1923.

1,450,769

UNITED STATES PATENT OFFICE.

RAYMOND A. CROSBY, OF HOLYOKE, COLORADO.

TIRE-DEFLATION SIGNAL.

Application filed April 17, 1922. Serial No. 553,513.

*To all whom it may concern:*

Be it known that I, RAYMOND A. CROSBY, a citizen of the United States, residing at Holyoke, in the county of Phillips and State of Colorado, have invented certain new and useful Improvements in Tire-Deflation Signals; and I do hereby declare the following to be a full, clear, and exact description of the invention, such as will enable others skilled in the art to which it appertains to make and use the same.

The present invention relates to signal devices for pneumatic tires, and aims to provide a novel and improved device for producing an audible signal when the tire becomes deflated a certain amount, thereby warning the driver, in order that the tire can be inflated, replaced or repaired, to avoid running on a flat or under-inflated tire.

Another object of the invention is the provision of a simple and efficient device for attachment to the valve stem of a pneumatic tire and including means for opening the valve of the stem when the pressure becomes low, and also including a whistle that is blown by the escaping air, to give the warning signal.

A further object is to provide a novel dust cap for the signal device to prevent dust, dirt, water and other foreign matter from entering the device and valve stem, and which cap is automatically displaced from over the opening of the whistle, when the air is allowed to escape through the valve stem, in order that the whistle can be heard.

It is also an object of the invention to provide such a device comprising a compact and novel assemblage of the component elements, to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is an enlarged elevation of the device as applied on a valve stem.

Fig. 2 is a longitudinal section on the line 2—2 of Fig. 1.

Fig. 3 is a cross section on the line 3—3 of Fig. 2.

The signal device comprises a tube 7 of suitable metal, which is interiorly screw-threaded and smooth on the exterior. One end of the tube is screw-threaded on the tip 8 of the valve stem 9, and a lock nut 10 is also threaded on the tip of the valve stem to abut the end of the tube 7, for locking the tube in place. The nut 10 is of larger diameter than the tube, to be conveniently rotated by hand when the tube 7 has been adjusted.

The other end of the tube is closed by a plug 11 screw-threaded thereinto, and a plug 12 is threaded into the tube and located between the ends thereof. The portion of the tube between the plugs 11 and 12 constitutes a whistle, and the tube is provided at one side with a whistle opening 13 adjacent to the plug 12. One side of the plug 12 is flattened, as at 14, to provide a passage 15 for the air leading to the opening 13, whereby the air in passing through said passage adjacent to the opening 13, will create a whistling noise that can be heard by the driver of the vehicle.

The tubular valve stem 9, is provided, as usual, with a check valve 16 on a rod 17 which extends loosely through the valve seat 18 which is screw-threaded into the tip 8 of the valve stem, and the valve 16 is seated under the tension of a spring 19, as well known.

The signal device includes spring-actuated means for opening the valve 16 when the air pressure in the tire is reduced to a predetermined amount. Thus, a tubular guide 20 has one end screw-threaded into the plug 12 opposite to the whistle portion of the tube 7, and the other end of the guide is contracted, as at 21. A rod 22 is slidable in the contracted portion 21, and has a head or enlargement 23 slidable in the guide 20, thereby guiding the rod 22 for longitudinal movement and retaining it assembled with the other parts. The projecting end of the rod 22 has a socket portion 24 to engage over the outer end of the valve rod 17. A coiled expansion spring 25 surrounds the guide 20 and is confined between the plug 12 and socket portion 24, whereby to yieldingly move the rod 22 toward the end of the tube 7 which is engaged on the valve stem. The guide 20, rod 22 and spring 25 are carried as a unit by the plug 12 for adjustment or removal with the plug.

A dust cap 26 of inflatable rubber is fitted on the tube 7, and has a bead 27 at its open end to snugly embrace the tube 7.

In applying the signal device to the valve stem, the open end of the tube 7 is screwed on the tip of the valve stem, the nut 10 having been previously threaded on said tip, and when the tube 7 is screwed into place, the socket portion 24 of the spring-pressed rod 22 will engage the outer end of the valve rod 17, thereby bringing the spring 25 under the compression, so that said spring tends to slide the rod 17 into the valve stem, for opening the valve 16, but such opening movement of the valve 16 is normally prevented by the preponderance of air pressure from within the tire, overcoming the effort of the spring 25. The dust cap 26 being fitted over the tube 7, will close the whistle opening 13, to prevent foreign matter from entering the tube 7.

Should the tire become deflated down to a predetermined pressure, so that the force of the spring 25 overcomes the pressure of the air against the valve 16, the spring 25 will assert itself and open the valve 16, thereby permitting the air to escape from the tire through the valve stem and into the tube 7. The air passing through the passage 15 and out through the opening 13, will inflate or blow up the cap 26, and the bead 27 will remain close around the tube 7. The air accumulating within the inflated cap 26 will cause the cap to be blown outwardly at least partly off the tube 7, until the bead 27 has moved past the opening 13. This automatically opens the dust cap to expose the opening 13, whereby the air in escaping will blow the whistle and give the warning signal. The tire can then be replaced, repaired or inflated to avoid damage to the tire, such as would result by under inflation or running on a flat tire.

Having thus described the invention, what is claimed as new is:—

1. A tire deflation signal comprising a tube to be engaged on a valve stem of a tire, a plug in the tube providing an air passage, the tube having a whistle opening adjacent to said plug and passage, and movable spring-pressed means carried as a unit by the plug for adjustment therewith, to engage and bear against the valve rod in said stem.

2. A tire deflation signal comprising a tube to be engaged on a valve stem of a tire, a plug in the tube between the ends thereof having an air passage, the tube having a whistle opening, a rod having a slidable connection with the plug and a portion to engage a valve rod in said stem, and a coiled spring surrounding the rod and confined between said portion and plug, said rod and spring being carried as a unit by said plug.

3. A tire deflation signal comprising a tube to engage over a valve stem of a tire, a plug in the tube providing an air passage, the tube having a whistle opening, a tubular guide carried by said plug and projecting toward one end of the tube, a rod slidable in said guide and having a portion to engage a valve rod in said stem, and a coiled spring surrounding said guide and confined between said portion and plug, said guide, rod and spring being carried as a unit by the plug.

4. A tire deflation signal comprising a tube, one end of which is engageable over a valve stem of a tire, a plug in the tube providing an air passage, the tube having a whistle opening, a tubular guide secured to the plug and projecting toward said end of the tube, the end of the guide opposite to the plug being contracted, a rod slidable through said contracted end of the guide and having an enlargement slidable in said guide, the projecting portion of the rod having a portion to bear against the end of a valve rod in said stem, and a coiled spring surrounding said guide and confined between said plug and the last named portion of said rod.

5. A tire deflation signal comprising a whistle tube for connection with a valve stem, having a whistle opening, and a resilient dust cap fitted for sliding movement over said tube to close said opening and adapted to be inflated and slid partly off said tube to uncover said opening.

6. A tire deflation signal comprising a whistle tube having a whistle opening at one side, and a resilient dust cap fitted for sliding movement over said tube to close said opening and adapted to be inflated by air passing through said opening for sliding the cap at least partly off the tube to uncover said opening.

7. A tire deflation signal comprising a whistle tube for connection with a valve stem of a tire and having a whistle opening at one side, means for opening the valve of said stem when the pressure becomes low, and resilient dust cap fitted for sliding movement over said tube to cover said opening, and having a bead at its open end embracing the tube, said cap being inflated by air escaping through said opening for sliding the cap at least partly off the tube with the bead moved past said opening.

In testimony whereof I have signed my name to this specification in the presence of two subscribing witnesses.

RAYMOND A. CROSBY.

Witnesses:
A. G. SCOTT,
W. J. FULSCHER.